United States Patent [19]

Lindgren

[11] Patent Number: 4,552,338

[45] Date of Patent: Nov. 12, 1985

[54] DEVICE FOR PUSHING OR PULLING ELONGATE WIRE- OR ROD-SHAPED ELEMENTS THROUGH CONDUITS

[75] Inventor: Per Lindgren, Vingåker, Sweden

[73] Assignee: Company PAX, Halleforsnas, Sweden

[21] Appl. No.: 509,968

[22] Filed: Jun. 30, 1983

[30] Foreign Application Priority Data

Jul. 13, 1982 [SE] Sweden ................ 8204296

[51] Int. Cl.[4] ............................................ B65H 59/00
[52] U.S. Cl. ........................................... 254/134.3 FT
[58] Field of Search ................ 254/29 R, 30, 31, 108, 254/134.3 R, 134.3 FT; 403/348, 353; 24/115 G, 116 R, 116 A, 132 AA, 616; 15/104.3 SN

[56] References Cited

U.S. PATENT DOCUMENTS

| | | | |
|---|---|---|---|
| 1,368,665 | 2/1921 | Strauss | 24/116 A |
| 1,959,490 | 5/1934 | Mistelski . | |
| 1,963,561 | 6/1934 | Sanger | 15/104.3 SN |
| 2,160,395 | 5/1939 | Wettlaufer | 254/30 |
| 3,185,318 | 5/1965 | Lewis, Sr. | 254/108 |
| 3,645,502 | 2/1972 | Stromp, Jr. | 254/29 R |

FOREIGN PATENT DOCUMENTS

140707 3/1953 Sweden .
304515 1/1955 Switzerland .

*Primary Examiner*—Frederick R. Schmidt
*Assistant Examiner*—Judy J. Hartman
*Attorney, Agent, or Firm*—Karl F. Ross; Herbert Dubno

[57] ABSTRACT

A device for pushing or pulling elongate wire- or rod-shaped elements through conduits comprises a conduit draw wire (100) defined by a plurality of separated groups of beads (101) slipped on a wire (11) alternately with helical springs (12). With the aid of a coupling device (13, 14') several such lengths may be coupled together or complementary components (15') may be attached. An apparatus (200) may be provided which comprises a runner (23) which via an engagement hook (24) transports the wire during a feeding stroke, alternately with a return stroke of no engagement between the draw wire and runner.

18 Claims, 13 Drawing Figures

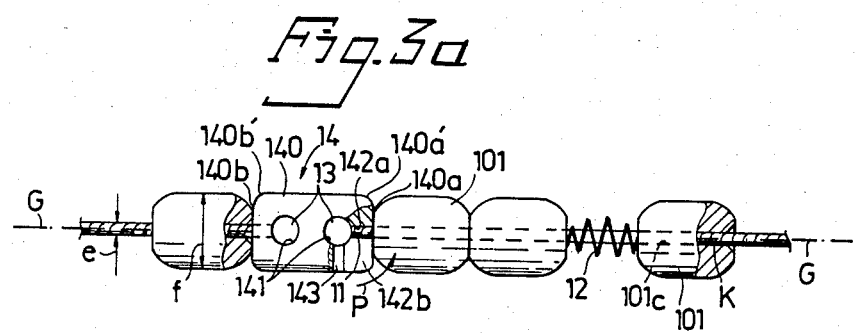
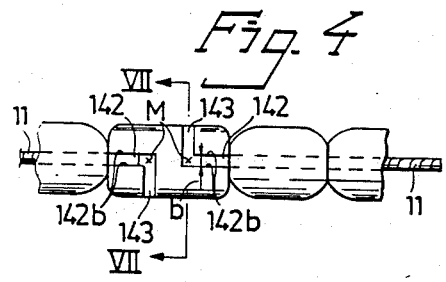 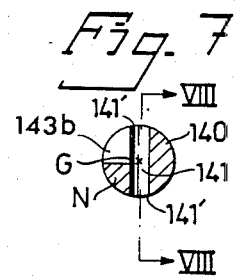
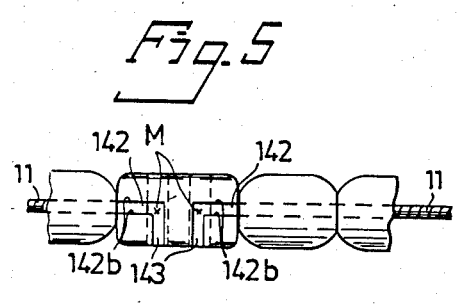 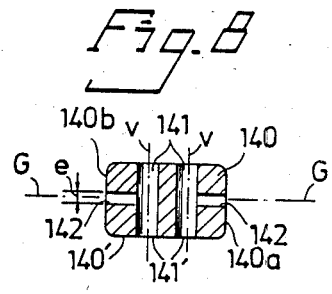
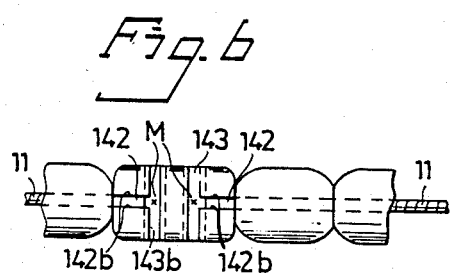

DEVICE FOR PUSHING OR PULLING ELONGATE WIRE- OR ROD-SHAPED ELEMENTS THROUGH CONDUITS

FIELD OF THE INVENTION

The invention relates to a device for pushing or pulling elongate, wire- or rod-shaped elements through conduits, a typical application being the introduction of electrical conductors into conduits provided in the walls of a building.

BACKGROUND OF THE INVENTION

A number of devices for this purpose have already been proposed beside the well known simple conduit-draw-wire defined by a bendable element with the cross-sectional diameter of some millimeters and a length of several meters.

In Swiss Pat. No. 304 515, issued on Mar. 16, 1955 to Gesellschaft für Kunsthornindustrie, an improved conduit-draw-wire is described which consists of a large number of rigid bead-shaped elements perforated with axial holes and threaded together by a bendable, not stretchable wire terminated at one end by a wire loop for hooking fast to a conductor, and at the other end either by an identical hook or by a bead element defining an end piece.

A single helical compression spring may be inserted between the loop and the adjacent first bead element to compensate possible undesired stretching of the wire, but otherwise the whole length of the wire is covered by closely adjacent bead elements. The bead elements may be elongate and have a spherical convex front face at one end and a funnel-shaped recess on the other end into which said front face of an adjacent element can be accommodated in order to achieve increased rigidity of the whole device.

In the Swedish Pat. No. 140 707 issued on Mar. 19, 1953 to A. Brunschweiler & Cie. an apparatus for pushing a conduit-draw-wire defined by a bendable bar of plastics material, into a conduit is described. The apparatus comprises two coaxial tubes, one telescoped into the other, and a third tube, aligned with and spaced from the other two tubes. A pushing mechanism for the draw wire, comprising a carrier element, is mounted between the two telescoped tubes and the third tube. This mechanism is stationary relative the tubes.

Another apparatus to facilitate the introduction of conductors into conduits is described in the U.S. Pat. No. 1,959,490 issued on May 22, 1934 to T. Mistelski. Here, no conduit-draw-wire is used, but the conductor itself is fed through a slotted or drilled bar accomodated in a rigid and possibly longitudinally slotted tube at the rear end of which an actuating mechanism for the rod is provided to reciprocatorily move it in said tube.

OBJECTS OF THE INVENTION

It is an object of the present invention to further improve a conduit-draw-wire type device of the aforesaid bead element type.

Another object of the invention is to provide a connecting means defining an end piece of such a device and enabling a ready and reliable connection of several separate lengths.

Still another object of the present invention is to provide an improved apparatus for pushing or pulling elongate bendable elements such as conduit-draw-wires through conduits.

BRIEF DESCRIPTION OF THE DRAWING

The invention will now be described in greater detail with the aid of the enclosed schematic drawing which refer to exemplary embodiments and in which FIG. 3a is an elevational view of the terminal portions of two devices as shown in FIG. 1 coupled together with the aid of an intermediate coupling member, and FIG. 3b shows the coupling region after insertion of one device into the other and before the first device is swung up into the position shown in FIG. 3a;

FIG. 4 is an elevational view of the intermediate member of FIG. 3 turned through 90° about its longitudinal axis, FIGS. 5 and 6 are elevational views similar to FIG. 4 of two alternative embodiments, FIG. 7 is a cross-section along the line VII—VII in FIG. 4, FIG. 8 is a cross-section along the line VIII—VIII of FIG. 7.

SPECIFIC DESCRIPTION

Figure 1:
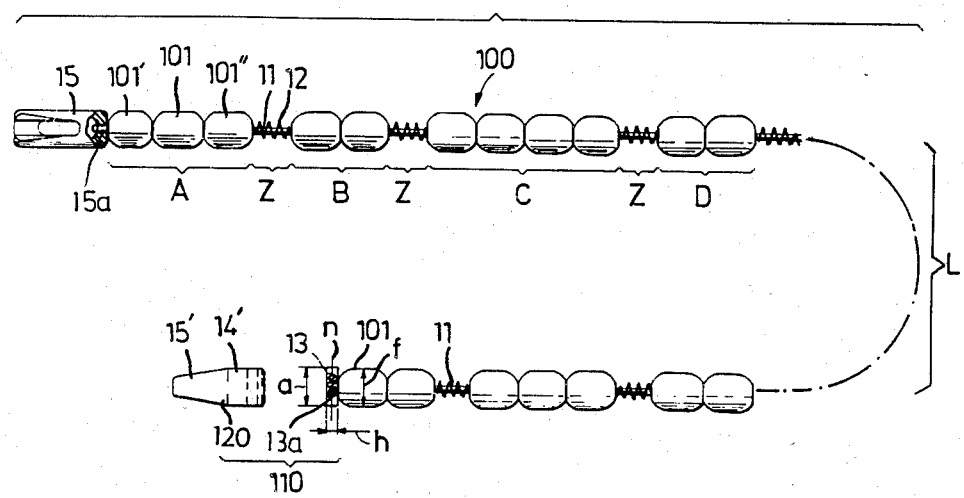
FIG. 1 is an elevational view of a length of a conduit-draw-wire according to the invention.
Figure 2:
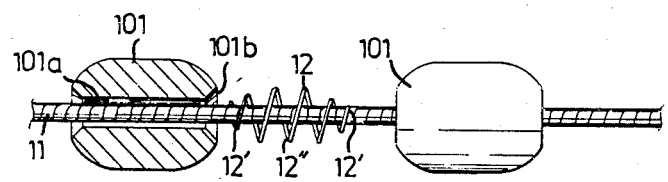
FIG. 2 is an elevational view on a larger scale and partly in section of a portion of the device of FIG. 1.

FIGS. 1 and 2 show, a conduit-draw-wire 100 defined by a plurality of distinct groups of beads, each group such as A, B, C, D consisting of at least two closely adjacent rigid beads or bead elements 101 including a first end bead 101' a second end bead 101'', slipped-on on a selected length L of a bendable cord or wire 11. Each group of beads is separated from the neighboring group by an interspace Z in which a helical compression spring 12 is mounted. It is not critical whether all groups comprise the same number of beads or not. Typically, approximately six groups may be provided on a wire 11 which is 2.5 m long. The beads are preferably somewhat elongated with a diameter of e.g. 10 mm and a length of e.g. 12 mm and have an axial bore 101a through which wire 11 with a diameter of e.g. 1.5 mm can pass freely. The helical springs may have approximately the same length as one bead and shall not have greater length than two beads.

At least the end beads 101', 101'', and at least at their side turned towards the neighboring group, may be according to FIG. 2 provided with a shallow recess 101b surrounding the orifice of the axial bore 101a and intended to accommodate an end part 12' of spring 12. Conveniently, spring 12 has turns with smaller diameter in its both end parts 12' than in the middle part 12'', and recess 101b may be then made funnel-shaped to fit the shape of the spring. This arrangement facilitates assembly and has even favorable effects on the performance, but in principle the springs and/or the recesses may also have cylindrical or other shape.

It will be appreciated that with regard to economic production and easy assembly, all beads may be provided with said recesses, and at both orifices of the axial bore.

The wire 11 is at both its ends firmly anchored in end pieces, and length L is selected so that springs 12 constantly are somewhat compressed, as the outer end beads in the two outer groups bear against the end pieces. In the example shown, wire 11 is at one end anchored in a rigid eye member 15, defining one of said end pieces and to which the end of an electrical conductor which is to be drawn through a conduit can be hooked on.

The end piece at the other end of wire 11 is, according to a preferred alternative, embodied by a short pin or rod 13 having an axis n and defining one part or member of a disengaging coupling 110. Rod 13 has a diameter h and a length a which at the utmost is equal to the diameter f of the bead elements 101. A second part or member of this coupling is defined by a coupling part 14' of a separate eye member 120 which further has a part 15' which in shape and function corresponds to eye member 15.

Figure 3B:
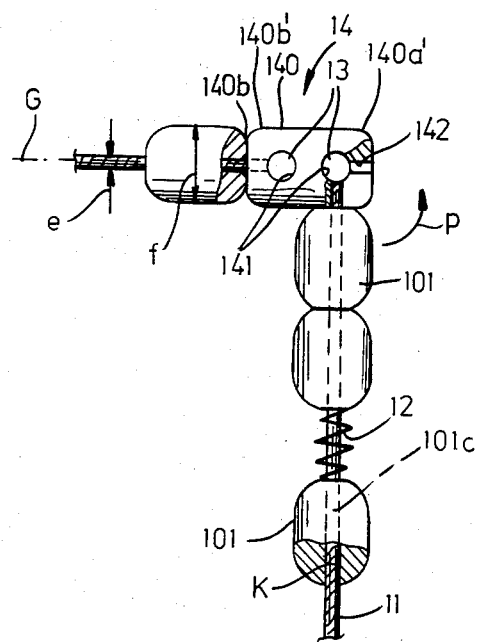

As will be explained (together with the detailed arrangement of coupling part 14') in greater detail below, instead of eye member 120, another length L of the device 100 may be attached to the present length L with the aid of an intermediate coupling member 14 (FIG. 3). Conventional conduit-draw-wires are say 6 to 10 meters long. According to the present invention, a plurality of smaller lengths, e.g. each only 2.5 m long, sufficient for short conduits, can be provided instead. For longer conduits, the necessary number of lengths may be readily assembled and eye element 120 attached to one end of the assembly. No particular part needs to be attached to rod 13 at the rear end of the assembly. A draw wire element according to the present invention and having a length of 2.5 m may e.g. comprise seven groups with the following numbers of beads: 25-40-40-40-40-40-25.

The main effect of the plurality of the interspaces bridged by interposed helical springs is to make the device better apt to penetrate into conduits with several and/or sharp bends. It is of course easier to work with a device having just the required length than being forced to use always a "full-length" device which is 6 to 10 m long.

It is not important if all groups include identical or different numbers of bead elements. The bead elements may either all be freely movable on wire 11, or individual bead elements at selected spacements may be affixed to wire 11 e.g. by being bonded thereto.

An intermediate coupling member for linking together two elements, each provided at its end with an identical pin- or rod-shaped coupling member 13, is shown in FIGS. 3 to 8.

The intermediate member 14 has a substantially cylindrical body 140 with rounded edges 140a', 140b' and in which two parallel, transverse, cylindrical bores 141 having axes v (FIG. 8) are provided, each adapted to receive one rod 13. Between each bore 141 and the adjacent end or front face 140a, 140b of body 140 extend grooves or passages 142 whose bottom 142a is located substantially at the longitudinal axis G of body 140, or, more precisely, half the diameter e of wire 11 beyond this axis. The grooves 142 have planar side walls 142b and a breadth b which at least corresponds to said diameter e and in any case is smaller than the diameter h of the rods 13.

To each groove 142 is at right angles connected a similar groove or passage 143 having planar side walls 143b (FIGS. 6,7) and the same breadth (i.e. essentially equal to e) and depth as the grooves 142. The grooves 143 extend between the pertinent groove 142 and the mouth 141' (FIG. 8) of bore 141 at the side wall 140' of body 140. However, grooves 143 do not have any bottom, as they open below in the somewhat broader cylindrical bores 141 and do not continue beyond them. The central planes of symmetry of grooves 143 and bores 141 coincide. Grooves 143 may, however, either extend on both sides from the grooves 142 and thus also occupy the shadowed region N in FIG. 7, i.e. extend towards both orifices of each bore 141 as shown in FIG. 6 or, as shown in FIG. 5, both can extend towards the same side of body 140.

The intermediate member 14 gets connected to a rod-shaped coupling member 13 by the latter being pushed into one of the bores 141 from that side where a groove 142 is provided, the wire 11 being lead in said groove 142. Member 14 is first held in a position where axis G as well as bore 141 subtend a right angle with wire 11 (according to e.g. FIG. 3, wire 11 would penetrate into groove 143 from below). When rod 13 has been introduced so far into bore 141 that wire 11 has reached a location M where the grooves 142 and 143 meet, a relative rotation of body 140 and wire 11 in the sense of arrow P is performed in order to bring wire 11 into the axial position shown in the FIGS. 3 and 4 to 6. It will be understood that, essentially, bore 141 must have an orifice at the surface of body 14 only on one side, and can also be defined by blind hole.

It will now be readily understood that the coupling part 14' of eye member 120 in FIG. 1 simply is one half of such an intermediate member 14, the other half having been replaced by the eye part 15'. It will be equally readily understood that instead of eye part 15' also any other desired element may be merged with one half of an intermediate member 14 and thus made attachable to the end of a selected number of interconnected lengths L.

It will be appreciated that two, but not more, lengths L as shown in FIG. 1 may be connected with the aid of an intermediate member 14. If, however, instead of eye member 15 another rod 13 is arranged, then an unlimited number of lengths L may be connected one to another with the aid of intermediate members 14, and to the forward rod 13 on the first length L a member 120 is coupled.

For disengagement of eye member 120 or intermediate member 14 from rod 13 or, more precisely, from the element which is attached to rod 13, the above described coupling process is reversed, beginning with a relative rotation against the sense of arrow P. Then rod 13 in bore 141 and wire 11 in groove 143 are moved towards the respective orifices and completely out of said bore and groove. It will be realized that the circumstances that compression springs 12 are interposed between the groups of beads may facilitate said relative rotation when the rounded edges 140a', 140b' of body 140 have to be passed. However, the inherent resiliency of a relatively long cord or wire is also sufficient. Moreover, if desired or necessary, the front face 140a, 140b of body 140 may be shaped semi-cylindrical or semi-spherical with the center of curvature on axis v.

Figure 9:
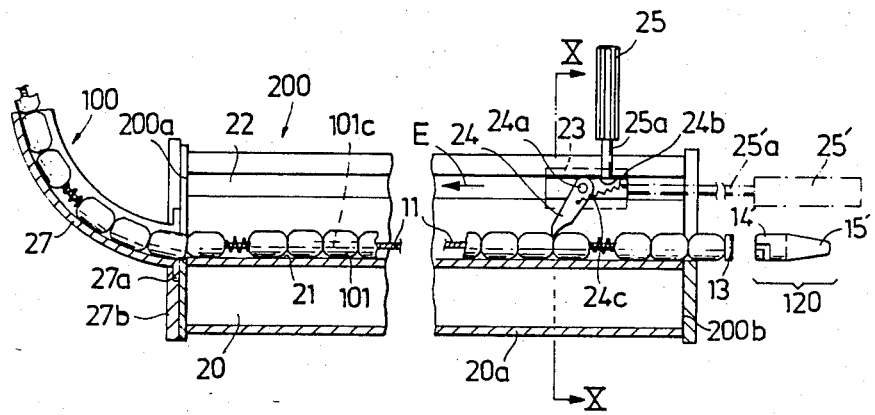
FIG. 9 is a longitudinal sectional view of an apparatus for pushing or pulling elongate bendable objects such as a conduit-draw-wire of FIG. 1 through conduits.

In FIG. 9 is shown an apparatus 200 for pushing or pulling an elongate bendable element such as conduit-draw-wire 100 of FIG. 1 through a conduit (not shown). The apparatus has an elongate body 20, e.g. substantially in the shape of a hollow cylindrical body having an outer wall 20a. In the axial region of cylindrical body 20 is a track or path 21 for a selected part (conveniently in the order of several decimeters) of respective element, such as draw wire 100, provided. Track 21 is in the drawing shown to be rectilinear, but it may be also curved, e.g. in the drawing plane with at least one of its ends lying either higher or lower than the middle region thereof. Parallel with track 21 is another track 22, substantially equally long as track 21, provided which defines a running track for a runner or slider 23. Track 22 is in the example shown also rectilinear.

An engagement hook or pawl 24 is pivoted to runner 23 with the aid of a pivot pin 24a and is affected by a spring 24b so as to engage element 100 when this is located in track 21. The inclination of hook 24 relative the tracks 21 and 22, and the shape of its free end are selected so as to enable for the free end to penetrate between two adjacent bead elements 101, and a stop 24c is provided to secure this inclination.

When apparatus 200 is intended for pushing element 100, the inclination of hook 24 will be in the direction of push E, as illustrated. When the apparatus 200 is to be used for pulling, either the inclination will be reversed, or simply the whole apparatus may be used in reversed position. Apparatus 200 as illustrated in FIG. 9 may thus be used either for pushing an element 100 into a conduit situated to the left, or pulling it out of a conduit situated to the right.

It will be appreciated that, relying on the proper weight of hook 24, spring 24b may be omitted, or that instead of a pivotally attached hook a resilient, projecting engagement hook may be fixedly attached to runner 23.

Figure 10:
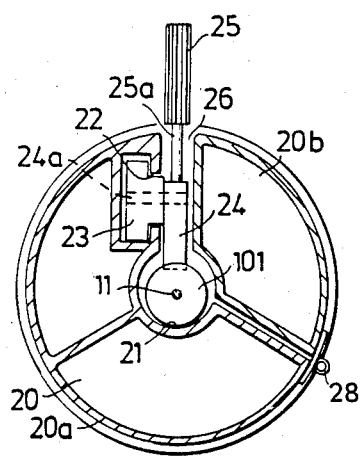
FIG. 10 is a cross-section along the line X—X in FIG. 9.

The runner 23 is driven in track 22 by a handle 25, 25' which either may be attached thereto with the aid of long rod 25'a, passing through track 22, as shown in phantom in the drawing, or by a shorter rod 25a extending at right angles to track 22 and passing through an elongate slot 26 (FIG. 10) in body 20 and wall 20a, parallel with and adjacent to track 22, as shown in full lines. At all events, hook 24 engages element 100 at each feeding stroke (in the sense of arrow E) and releases it at each return stroke (against the sense of arrow E).

If it shall be possible to turn either end of apparatus 200 towards the orifice of a conduit (to use the apparatus for either pushing or pulling), the alternative with slot 26 and short rod 25a is selected.

At at least one end 200a of body 20 may a curved feed-out spout 27 with U-shaped profile be rotarily mounted with the aid of an inner flange 27a affixed to the spout 27 and an annular outer flange 27b affixed to the body 20 and having an inner portion overlapping said outer edge and engaging it. The bottom of spout 27 is at the place of attachment to body 20 flush with the bottom of track 21.

Conduit-draw-wire 100 may be introduced into track 22 from the rear end 200b of body 20 (where no spout is provided) until it becomes engaged by hook 24, whereupon runner 23 is with the aid of handle 25 or 25' reciprocated in track 26 so many times till a desired section of draw wire 100 has been fed out through spout 27 and fed in into a conduit to the orifice of which spout 27 has been brought. Preferably, however, body 20 is according to FIG. 10 made in two parts 20a, 20b hinged together by a hinge means 28 so that it may be opened longitudinally and give free access to track 21 along the whole extent thereof. A locking means may be provided to secure parts 20a and 20b in the closed position. By pivoting part 20b aside, any selected part of draw wire 100 can be placed in track 21 and possibly also in spout 27. When parts 20a, 20b have been closed again, the apparatus is operated as described above, with the exception of course of the first introduction of draw wire 11 from the rear end.

Figure 11:
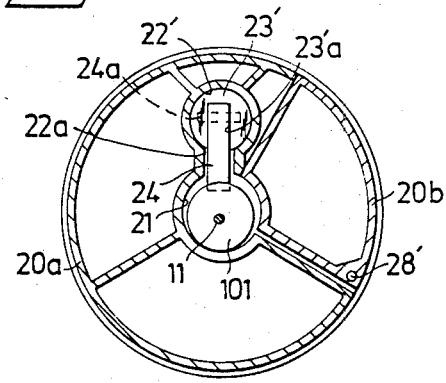
FIG. 11 is a similar cross-section through a modified embodiment.

In FIG. 11 is shown a convenient alternative of runner 23' defined by a cylindrical body provided with groove 23'a in which hook 24, pivot 24a and possibly also spring 24b are arranged. Track 22' is then of course also cylindrical and a slot 22a for hook 24 interconnects the two tracks 21, 22'. Rod 25'a and handle 25' are preferably used, and runner 23', rod 25'a and handle 25' may be merged into one single component, and/or hook 24 may be embodied by a leaf spring affixed to runner 23' and passing through slot 22a into engagement with element 100.

The main advantage of an apparatus 200 having a divided body 20 is that draw wire 100 can be taken out at any arbitrary location. If e.g. several conduits issue from one junction box, the draw wire may be first pushed through one of the conduits, then the apparatus can be opened and used for pushing the rear end of the same draw wire, or another draw wire, into another conduit leading from the same junction box.

Figure 12:
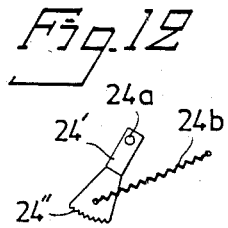
FIG. 12 is a view of a modified embodiment of an engagement hook in the embodiments of FIGS. 9 to 11.

It will be realized that the use of the apparatus described is by no means limited to the conduit-draw-wire 100 described, or to some other element provided with a plurality of beads. The engagement part proper of hook 24 may be readily shaped in known manner for engagement with a smooth surface such as that of a plastics draw wire described in the aforementioned Swedish Pat. No. 140 707, or of the conductor proper, as described in the aforementioned U.S. Pat. No. 1,959,490, or of any other wire- or rod-shaped element with appreciable greater length than diameter. Such engagement hook 24' may have e.g. a groove or knurled engagement edge 24" as shown in FIG. 12.

I claim:
1. A device for displacing a conduit draw wire through a conduit, comprising an elongate apparatus body with a first track for a selected length of said conduit draw wire and a carrier means for transporting said conduit draw wire element in the track during a feeding stroke and releasing it during a return stroke, wherein an equilong parallel second track is provided in the body for a runner, said carrier means is mounted on said runner and a handle projecting from the body is provided to drive the runner in said second track in alternating feeding strokes and return strokes, said conduit draw wire comprising a selected length of an elongate bendable member onto which is slipped a plurality of rigid beads with axial bores, the beads being arranged in a plurality of groups each of which comprises at least a first and a second end bead, each group being separated by an interspace from a neighboring group, a plurality of helical compression springs being provided, each having a middle part and two end parts and each spring being arranged in one of said interspaces to bear by said end parts against end beads of said groups disposed adjacent a respective interspace so as to push the groups apart, said member being at both ends firmly attached to end pieces and having a length selected so as to constantly keep said springs in a partially compressed state.

2. The device of claim 1, wherein said apparatus body is longitudinally divided into two parts which when separated give access to an entire length of the first track.

3. The device of claim 2, wherein the two parts of the body are hinged together by a hinge means.

4. The device defined in claim 1 wherein at least an end bead of one group at a side turned toward a neighboring group is provided with a recess accommodating a respective end part of an adjacent spring.

5. The device defined in claim 4 wherein each of said springs has at its end parts turns of smaller diameter than in a middle part of said springs, said recesses being funnel-shaped to fit the respective end parts of respective springs.

6. The device defined in claim 1 wherein said tracks are grooves limited by planar side walls.

7. A device for feeding a flexible conduit draw wire through a conduit, comprising a combination:
   an elongate apparatus body having a front end and a rear end;
   a first elongate track for a selected length of the draw wire and extending in said body between said two ends thereof;
   a second elongate track for accommodating a runner for smooth gliding movement and extending parallel and equilong with said first track;
   a first elongate slot in said body extending parallel and equilong with said two tracks and providing access into the first track along the entire length thereof;
   a driver engageable with said length of draw wire accommodated in said first track during a feeding stroke and releasing it during a reverse return stroke;
   a runner movably mounted for continuous gliding reciprocating movement in said second track and carrying said driver which passes through said first slot into said first track to selectively engage there and release said length of conduit wire;
   a rod for driving said runner in continuous reciprocating gliding movement in said second track for a feeding stroke and a return stroke of said driver, said rod being at a first end rigidly affixed to the runner, and an intermediate part thereof passing through an elongate opening extending in said body parallel and equilong with the first said track, and a second end projecting from said body; and
   an operating handle mounted on said second end.

8. The device of claim 7, wherein the second track is located in said body.

9. The device of claim 7, wherein said intermediate part of said rod passes through said second track parallel therewith and towards said rear end.

10. The device of claim 7, wherein a second elongate slot is provided in said body parallel, equilong and communicating with said second track, and said intermediate part of said rod passes through said second slot at right angles to the direction of the second track.

11. The device of claim 7, wherein said second track and said runner have cylindrical shape and said driver is pivotally mounted in a groove in the runner.

12. The device of claim 7, wherein a curved feed-out spout for the draw wire is provided at one of said ends of the apparatus body.

13. The device of claim 12, wherein the spout is rotarily mounted.

14. The device of claim 7, wherein the draw wire comprises a plurality of rigid bead elements having axial bores and slipped on a bendable cord means, and the driver has a free end adapted to penetrate behind a bead element.

15. The device of claim 14, wherein the bead elements are arranged in a plurality of groups, each of which comprises at least a first and a second end bead and by an interspace is separated from the neighboring group, a plurality of helical compression springs being provided each having a middle part and two end parts, and each spring being arranged in one of said interspaces to affect by said end parts the end beads adjacent the interspace so as to push the groups apart, the cord means is at both ends firmly attached to end pieces and the longitudinal extent the cord means is selected so as to constantly keep said springs in a partially compressed state.

16. The device of claim 7, wherein the apparatus body is a hollow cylinder defined by an outer wall.

17. The device of claim 7, wherein the driver is defined by an engagement hook.

18. The device of claim 7, wherein the driver is defined by a rigid pawl pivotally attached to the runner and in an inclined position relative to the direction of the first track affected by a spring means into engagement with the said length of drawing wire.

* * * * *